Figure 1:
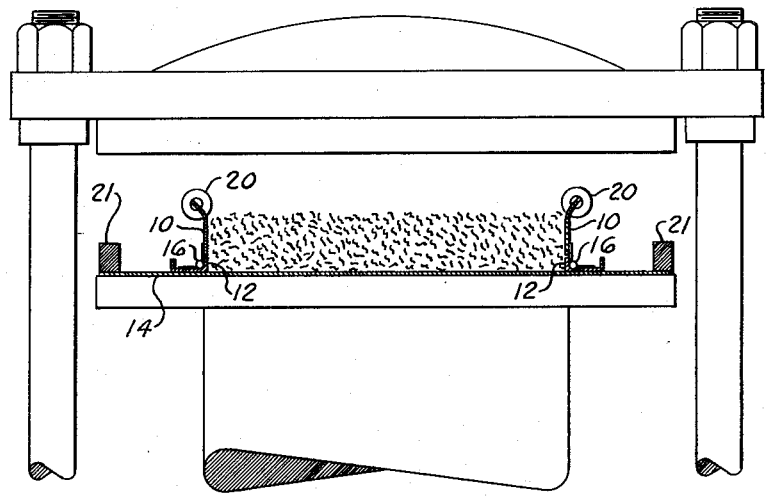

Sept. 28, 1954    H. R. ROGERS    2,689,979
REAGGREGATED WOOD FORMING TRAY

Filed March 23, 1953    2 Sheets-Sheet 1

INVENTOR
HUGH R. ROGERS
BY Harvey L. Joule
ATTORNEY

Sept. 28, 1954     H. R. ROGERS     2,689,979
REAGGREGATED WOOD FORMING TRAY
Filed March 23, 1953     2 Sheets-Sheet 2

INVENTOR
HUGH R. ROGERS
BY Harvey L. Towle
ATTORNEY

Patented Sept. 28, 1954

2,689,979

UNITED STATES PATENT OFFICE 2,689,979

REAGGREGATED WOOD FORMING TRAY

Hugh R. Rogers, Savannah, Ga.

Application March 23, 1953, Serial No. 343,818

3 Claims. (Cl. 18—34)

The present invention relates to the manufacture of composite board-like products from lignocellulose materials and known in the art as re-aggregated wood or chip-boards. More particularly, the invention relates to an improved mold for producing such chip-board products. Even more particularly, the invention relates to a novel molding tray having articulated side wall members and adapted to produce a greatly improved chip-board product.

In the commercial production of re-aggregated wood, the raw material usually consists of small particles of wood such as chips, shavings, and the like particles treated with a synthetic resin binding agent. This comminuted material is spread in an open top mold or molding tray and thereafter consolidated or re-aggregated under heat and pressure. The final product is board-like in appearance and characteristics, ordinarily having a density about that of wood and capable of being worked with wood-working tools. While the products so-produced have decided commercial utility, they are subject to certain important manufacturing disadvantages together with the resultant defects in the products.

More or less uniformly, the art has heretofore employed rectangular molds having rigid side walls. One type of mold is placed in a multi-opening press equipped with upper platens and/or pressing plates which extend downwardly and fit within the side walls of the mold when the press is in closed position. This type equipment has the following outstanding disadvantages during use. Each mold must be placed in precise position in its press opening otherwise the upper press platen will fail to fit into the mold opening. Slight dislocation of the mold results in costly damage. In another commonly employed mold, the height of the side walls is approximately equal to the thickness of the finished board product. In using this type mold, the wood particles must be piled in the mold with the greatest chip depth in the center thereof to prevent undue spilling of the raw material. During the pressing procedure, the pile of wood particles is flattened but, due to the nature of the chips, this compression does not extend uniformly over the entire area of the mold. Consequently, without exception, the prior art products had a relatively wide band of low density and insufficiently consolidated material extending around their entire circumference. Thus, it was necessary to cut off from about 3 to about 5 or more inches from each edge of the boards to obtain products of uniform density and strength. Obviously this has been costly and wasteful since it entails an additional operation and since the unfinished board must, of necessity, have been much larger than the finished uniform product. For example, in addition to the cost of trimming each board, there has been a waste of from about 8 square feet to about 14 square feet of product for each 48 square feet of acceptable board produced.

It is a primary object of the present invention to provide a means of producing improved chip-board products by overcoming the above-described difficulties and disadvantages.

It is a further object of the invention to provide a novel means for the production of such products.

Another object of the invention resides in the provision of a novel mold or molding tray having articulated side wall members.

Still another object of the invention resides in the provision of a mold in which board products of any desired thickness may be produced without recourse to individual molds for each thickness of product.

Briefly, the invention comprises an open top mold having pivoted side wall members. The mold is preferably of metal construction although, obviously, equivalent construction materials may be employed. The side wall members are pivoted at or near their line of juncture with the bottom of the mold. In their normal position of rest, the side wall members are vertically arranged to form a relatively tight open-topped container or tray. Under operating conditions, the side wall members are adapted to swing outwardly and downwardly under pressure of the upper press platen. An outstanding advantage to be derived from the novel mold resides in the fact that the raw wood particles to be consolidated may be spread in the mold to a uniform depth over the entire mold area. The board products obtained thereby are of uniform density throughout and there is no necessity for trimming them other than to remove a slight amount of flash from the product. Consequently, the so-produced boards present the important advantages of eliminating both the additional cost and the waste involved in the prior art manufacture of chip-boards.

Figure 2:
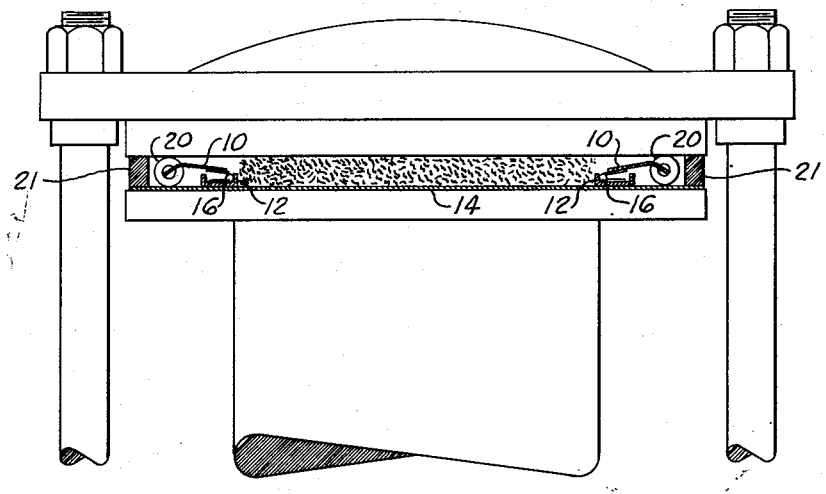
Figure 3:
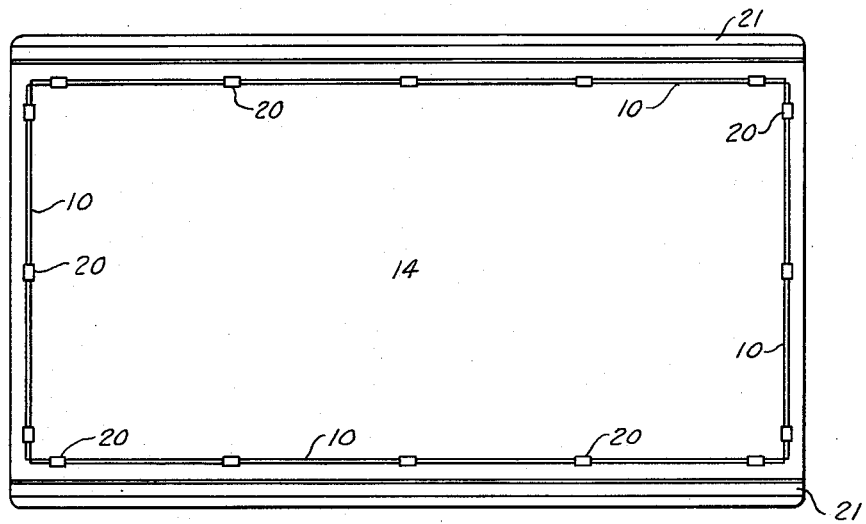
Figure 4:
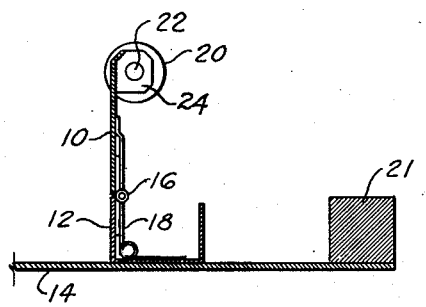
Figure 5:
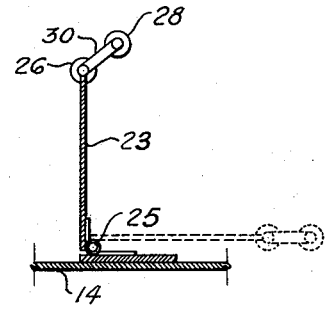

The invention will be described with more particularity with reference to the accompanying drawings in which Fig. 1 is a section of a side elevation of a press, in open position, containing a mold and charge of wood particles, Fig. 2 is a section of a side elevation of a press, in closed position, containing a mold and charge of compressed wood particles, Fig. 3 is a top plan view of a mold, Fig. 4 a sectional side elevation of a side wall member of a mold, and Fig. 5 is a sectional side elevation of a side wall member of alternate design.

In the drawings, the vertically disposed side wall members 10 may consist of flat metallic pieces. The side wall members 10 are cooperatively positioned immediately above the flanged base members 12 whose innermost vertical sides comprise, in effect, the lower portion of the side wall members. The base members 12 may be fixedly attached to the mold bottom 14 by any desired means as, for example, by spot welding, soldering, bolting, and the like means. The side wall members are articulated by the hinges 16 which may extend entirely across the side wall members 10 or may comprise a plurality of smaller hinges. The side wall members 10 may be maintained in their normal vertical position by the spring members 18 as shown in Fig. 4, or the hinges 16 may be of the spring-containing variety. While the curved upper edges of the side wall members 10 are well adapted to impart a downwardly swinging motion to the walls under the downward force exerted by the upper press platens, in its preferred embodiment the novel mold of the invention contains roller members 20 positioned along the upper edges of the side wall members 10 and so attached as to be offset from a vertical plane extending through the pivotal axis of the side wall members. The roller members 20 may be attached to the members 10 by any selected means as, for example, by means of shaft 22 mounted within the guide member 24 integrally attached to the side wall member 10. The roller members may be of any conventional type such as roll or ball bearing or the like. Suitable press stops 21 are affixed to the mold bottom, preferably along the longitudinal edges thereof.

An alternative construction of the side wall members is shown in Fig. 5 wherein the upright member 23 is pivotally attached to the mold bottom 14 by the hinge 25. The upper edge of the side wall member, in this alternate construction, is not curved and a pair of rolls 26, 28, attached by the connecting member 30 are employed.

In operation, wood particles which have been treated with a synthetic resin are placed in the mold, filling it to the depth required to produce a board product of any selected thickness. The particles of wood may be placed in the tray manually or by any selected mechanical means, such as, for example, from an automatic hopper device. The mold is then placed between the platens of a press which may be operated hydraulically, mechanically, or the like means. As the press is closed, the top platen thereof first comes in contact with the roller members 20. The movement of the press platens exerts a vertical force on these members and thereby causes the side wall members 10 to swing downwardly and outwardly through the focal points of the hinge members 16. During this motion of the press platens, the raw wood material is compressed to the desired thickness by either regulation of the applied pressure or by allowing the upper press platen to come in contact with the press stops 20. The woody material is retained in the press until the synthetic resin is cured. The press is then opened and the mold withdrawn. Due to the retaining action of the side wall members 10 during the entire operation, the board product thus produced is characterized by its substantial freedom from an area of relatively low density material around its circumference. It is only necessary, therefore, to trim the flash from the edges of the product in order to obtain a finished product of uniform density throughout its entire area. It will thus be seen that the articulated mold of the present invention provides a decided advantage over the rigid molds heretofore employed in the art.

From the foregoing description of the novel mold of the invention and of its use, it will be appreciated that, where desired, the upper edges of the side wall members may be curved outwardly thus eliminating the necessity for employing roller members. However, it should be borne in mind that, in employing this type of mold, there will be an appreciable degree of friction between the press platen and the curved side wall. It is therefore desirable, in order to avoid excessive wear, to maintain both the press platen and the curved side wall of the mold in highly polished condition and this involves additional maintenance expense. Similarly, where there is no objection to one of the board surfaces being of an irregular nature, the bottom of the mold may be comprised of wire mesh or the like perforated material which aids in dissipating the moisture contained in the wood during the pressing cycle.

It will also be apparent, although the foregoing description has been directed to the production of chip-board products, that the articulated mold of the invention may be employed equally as well in the production of a variety of compressed products from many other bulky raw materials. For example, the apparatus may be used in producing insulation boards from numerous felted materials, inorganic substances such as exfoliated vermiculite, clays, and the like raw materials.

I claim:

1. An articulated mold comprising a horizontal bottom member, vertically disposed side wall members pivotally attached to said bottom member, roller members positioned along the upper edges of said side wall members and attached thereto so as to be offset with relation to a vertical plane extending through the pivotal axes of said side wall members, and said side wall members adapted to remain in vertical position while at rest and adapted to swing downwardly and outwardly during the application of vertical force thereon.

2. A molding tray comprising a bottom member consisting essentially of a flat metal sheet, upright side wall members attached to said flat metal sheet in such arrangement as to provide a rectangular open-top container, said upright side-wall members being hinged to the bottom member, and roller members positioned along the upper edges of said side wall members and attached thereto so as to be offset with relation to a vertical plane extending through the pivotal axes of said side wall members.

3. An articulated mold comprising a horizontal bottom member consisting essentially of a flat metal sheet, upright side wall members attached to said flat bottom member, said side wall members consisting of upper elements of flat metal pivotally attached to lower angular elements, the two side wall elements cooperating to form a substantially flat continuous surface, roller members positioned along the upper edges of said upper side wall elements and attached thereto so as to be offset in relation to a vertical plane extending through the pivotal axes of said side wall members, and said side wall members adapted to remain in vertical position while at rest and adapted to swing downwardly and outwardly during the application of vertical force thereon.

References Cited in the file of this patent

UNITED STATES PATENTS

| Number | Name | Date |
|---|---|---|
| 1,919,070 | McKay et al. | July 18, 1933 |
| 2,574,915 | Fuller | Nov. 13, 1951 |